United States Patent
Lee et al.

(10) Patent No.: US 9,479,667 B1
(45) Date of Patent: Oct. 25, 2016

(54) ALIGNING MECHANISM OF 3D PRINTER SCANNING DEVICE

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Yang-Teh Lee, New Taipei (TW); Jia-Yi Juang, New Taipei (TW); Jen-Hsiang Liu, New Taipei (TW); Chi-Chieh Wu, New Taipei (TW); Yi-Min Chiu, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 0 days.

(21) Appl. No.: 14/806,866

(22) Filed: Jul. 23, 2015

(30) Foreign Application Priority Data

Jun. 1, 2015 (CN) .......................... 2015 1 0292835

(51) Int. Cl.
*G06F 3/12* (2006.01)
*G06K 15/10* (2006.01)
*H04N 1/047* (2006.01)

(52) U.S. Cl.
CPC ...... *H04N 1/047* (2013.01); *H04N 2201/0081* (2013.01); *H04N 2201/0422* (2013.01); *H04N 2201/0426* (2013.01); *H04N 2201/0448* (2013.01)

(58) Field of Classification Search
CPC .............. B29C 67/00; B29C 67/0088; B29C 67/0066; B29C 67/0051; B29C 67/0055; B29C 67/0029; B05D 1/265; B05C 1/02; G06K 15/1809; H04N 13/02; H04N 2201/0081; H04N 2201/0422; H04N 2201/0426; H04N 2201/0448; B33Y 30/00; B33Y 50/02; B29K 2101/12
USPC ........ 358/493, 474, 296, 401, 501, 505, 1.1, 358/1.13, 1.8
See application file for complete search history.

(56) References Cited

U.S. PATENT DOCUMENTS

| | | | |
|---|---|---|---|
| 8,285,130 B1 * | 10/2012 | Lai ........................ | G03B 15/06 396/5 |
| 9,358,728 B1 * | 6/2016 | Chang ..................... | B29C 31/04 |
| 9,364,995 B2 * | 6/2016 | Roberts, IV ........ | B29C 67/0088 |
| 2001/0019340 A1 * | 9/2001 | Kubo ......................... | B41J 2/01 347/1 |
| 2006/0147188 A1 * | 7/2006 | Weng ................... | F16M 11/046 396/5 |
| 2007/0035539 A1 * | 2/2007 | Matsumura ........... | G06T 7/0067 345/419 |
| 2014/0265034 A1 * | 9/2014 | Dudley ............... | B29C 67/0062 264/401 |
| 2014/0271964 A1 * | 9/2014 | Roberts, IV ........ | B29C 67/0055 425/150 |
| 2014/0374949 A1 * | 12/2014 | Toh ..................... | B29C 67/0088 264/241 |
| 2015/0054918 A1 * | 2/2015 | Lee ..................... | H04N 13/0221 348/46 |

(Continued)

*Primary Examiner* — Cheukfan Lee
(74) *Attorney, Agent, or Firm* — Chun-Ming Shih; HDLS IPR Services

(57) ABSTRACT

In an aligning mechanism of a 3D printer scanning device, a scan driving module includes a base and a motor, and the motor has a driving gear. The scan loading module includes a loading table, a turntable, and an engaging gear connected to the turntable, and the loading table has a notch, and the engaging gear is exposed from the notch. The driving gear of the scan driving module and the engaging gear of the scan loading module have a rounded corner or a positioning portion, so that the driving gear is engaged precisely with the engaging gear.

11 Claims, 10 Drawing Sheets

(56) References Cited

U.S. PATENT DOCUMENTS

| | | | | |
|---|---|---|---|---|
| 2015/0057785 A1* | 2/2015 | Liu | ............ | G05B 19/4099 700/119 |
| 2015/0110912 A1* | 4/2015 | Okamura | ............ | B29C 67/0055 425/162 |
| 2015/0170009 A1* | 6/2015 | Cudak | ............ | G06K 15/00 358/1.15 |
| 2015/0298395 A1* | 10/2015 | Yeh | ............ | B29C 67/0088 700/120 |
| 2015/0319418 A1* | 11/2015 | Yahav | ............ | G03B 15/00 348/50 |
| 2016/0052210 A1* | 2/2016 | Jeng | ............ | H04N 1/02895 700/98 |
| 2016/0176108 A1* | 6/2016 | Tadin | ............ | B29C 67/0055 425/375 |

\* cited by examiner

ALIGNING MECHANISM OF 3D PRINTER SCANNING DEVICE

FIELD OF THE INVENTION

The technical field relates to a three-dimensional (3D) printer, more particularly to an aligning mechanism of a 3D printer scanning device.

BACKGROUND OF THE INVENTION

3D Printing is a quick formation technology (also known as Additive Manufacturing (AM) or Layer Formation. In an embodiment of the 3D printing technology, a material contained in a pipe is squeezed uniformly out from the pipe and stacked into a 3D physical form according to an instruction of a computer graphic software program. To form a 3D model quickly, a 3D scanning device is provided for obtaining the 3D space data of an object, and then the 3D space data are read to build the 3D printing object according to the instruction of the computer graphic software program.

In addition, a detachable 3D scanning device may be added and installed to the 3D printer, and such arrangement is a solution for reducing the total volume of the present 3D printers. The present 3D scanning device includes a load rotating module and a driving module, wherein a scanning object is put on the load rotating module, and the load rotating module is engaged with the driving module through a gear set and driven to rotate. Therefore, the load rotating module may be removed to facilitate the printing process when the scanning function is not used. However, the load rotating module is selectively combined with the driving module, so that if the load rotating module and the driving module are not securely positioned with respect to each other, then the gear set will be worn and damaged easily to affect the later operation. Therefore, it is a main subject for this disclosure to securely position the gear seat and the driving module of the load rotating module.

In view of the aforementioned problems of the prior art, the inventor of this disclosure based on years of experience in the industry to conduct extensive researches and experiments and finally invented a novel aligning mechanism for a 3D printer scanning device to overcome the problem of the prior art.

SUMMARY OF THE INVENTION

Therefore, it is a primary objective of this disclosure to provide an aligning mechanism of a 3D printer scanning device, wherein a driving gear can be engaged with an engaging gear precisely, so that the scan driving module can drive a scan loading module to rotate.

In an exemplary embodiment of this disclosure, a 3D printer scanning device includes a body, a scan driving module and a scan loading module. The scan driving module is installed in the body and includes a base and a motor installed in the base, and the motor includes a driving gear, and each gear of the driving gear has a first rounded corner. The scan loading module is installed in the body and includes a loading table, a turntable combined with the loading table and an engaging gear connected to the turntable, and a side of the loading table has a notch and the engaging gear is exposed from the notch. The driving gear of the scan driving module and the engaging gear of the scan loading module can be engaged precisely with each other trough the first rounded corner, so that the driving gear can be engaged with the engaging gear precisely to drive the scan driving module to rotate the turntable of the scan loading module.

In an exemplary embodiment of this disclosure, a 3D printer scanning device includes a body, a scan driving module and a scan loading module. The scan driving module is installed in the body and includes a base and a motor installed in the base, and the base includes a plurality of first positioning portions formed thereon, and the motor has a driving gear. The scan loading module is installed in the body and includes a loading table, a turntable combined with the loading table, and an engaging gear connected to the turntable, and a side of the loading table has a notch, and the engaging gear is exposed form the notch, and the loading table has a plurality of second positioning portions formed thereon and configured to be corresponsive to the first positioning portions respectively. The driving gear of the scan driving module and the engaging gear of the scan loading module are guided by the first positioning portion and the second positioning portion, so that the driving gear is engaged precisely with the engaging gear, and the scan driving module drives the rotation of the scan loading module.

Compared with the prior art, the 3D printer scanning device of this disclosure includes the scan driving module and the scan loading module, and the scan driving module has the driving gear, and the scan loading module is exposed from the engaging gear. In addition, the design of the driving gear and the engaging gear allows the driving gear to be engaged with the engaging gear precisely through the rounded corner and the positioning portion, so that the scan driving module can drive the turntable of the scan loading module to rotate. Therefore, the scanning device can be engaged for the transmission to improve the convenience and practicality.

DESCRIPTION OF THE PREFERRED EMBODIMENTS

Figure 1:
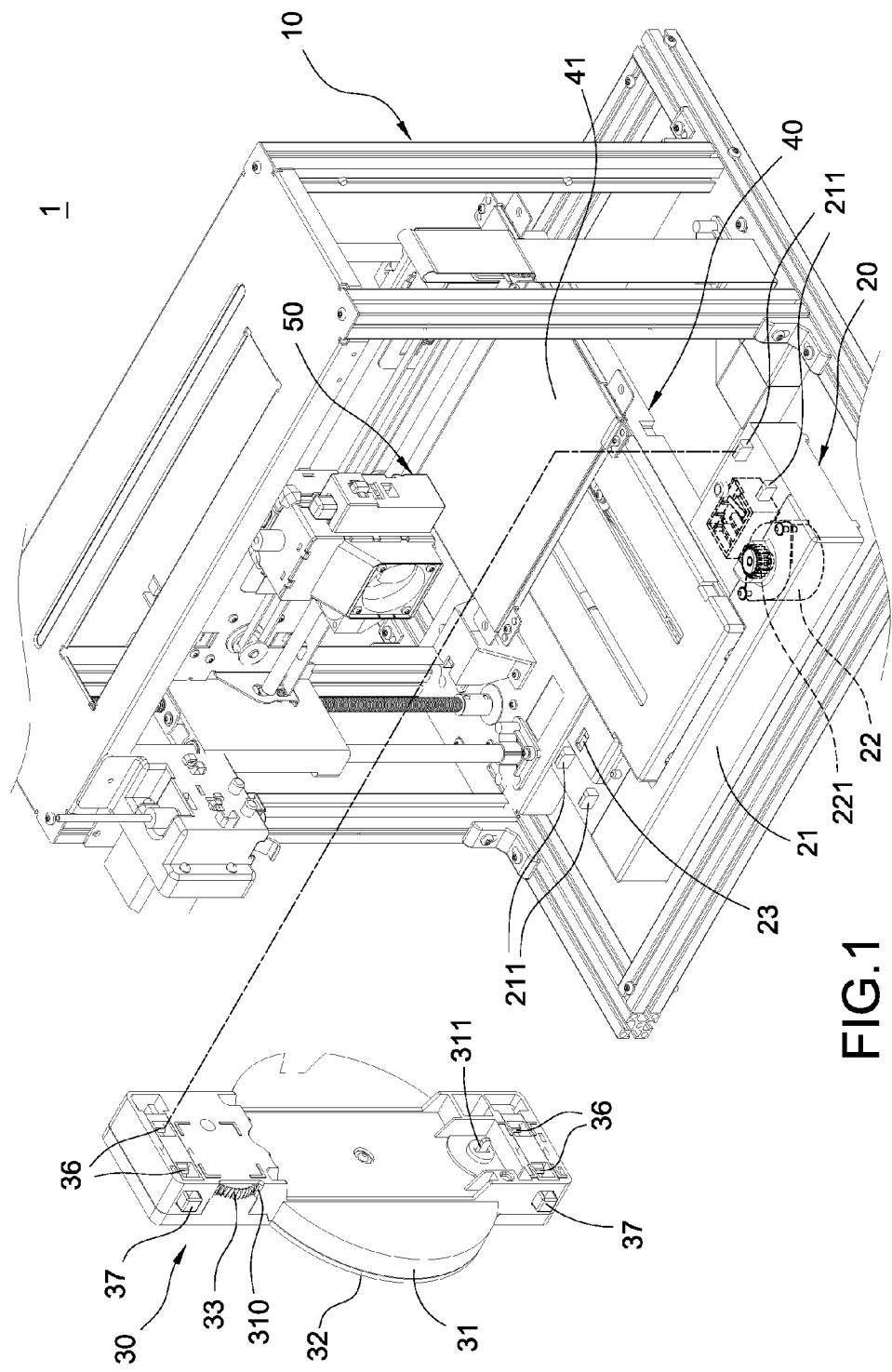
FIG. 1 is a schematic view of removing a scan loading module of a 3D printer of a first exemplary embodiment of this disclosure.

The technical contents of this disclosure will become apparent with the detailed description of preferred embodiments accompanied with the illustration of related drawings as follows.

With reference to FIGS. 1 to 4 for a schematic view of removing a scan loading module of a 3D printer, a schematic view of aligning a driving gear, a perspective view of a scanning device and a schematic partial view of the scanning device in accordance with a first exemplary embodiment of this disclosure respectively, the 3D printer 1 comprises a body 10, a scan driving module 20 and a scan loading module 30, wherein the scan driving module 20 and the scan loading module 30 are installed in the body 10, and the scan loading module is detachably combined with the scan driving module 20, so as to form a scanning device.

In this exemplary embodiment, the 3D printer 1 further comprises a printing platform 40 and a printing module 50. After a scanning object is placed onto the scanning device (including the scan driving module 20 and the scan loading module 30) and 3D space data of the object is obtained and inputted into a computer graphic software program, an instruction is inputted to control the printing platform 40 and the printing module 50 to execute a printing job. The printing platform 40 and the printing module 50 are installed in the body 10, and the printing platform 40 includes a movable printing carrier board 41. In addition, the printing module 50 is movable in the body 10 and with respect to the printing carrier board 41.

The scan driving module 20 is installed in the body 10 without interfering the movement of the printing carrier board 41. After the scan loading module 30 and the scan driving module 20 are positioned with respect to each other, the scan loading module 30 is driven by the scan driving module 20 to rotate. The positioning structure of the scan driving module 20 and the scan loading module 30 are described specifically below.

In this exemplary embodiment, the scan driving module 20 comprises a base 21 and a motor 22 installed in the base 21. In addition, the motor 22 has a driving gear 221. Each gear of the driving gear 221 has a first rounded corner 220. Further, the scan loading module 30 comprises a loading table 31, a turntable 32 combined with the loading table 31 and an engaging gear 33 connected to the turntable 32. A side of the loading table 31 has a notch 310, and the engaging gear 33 is exposed from the notch 310. Preferably, each gear of the engaging gear 33 has a second rounded corner 330. Therefore, the driving gear 221 of the scan driving module 20 and the engaging gear 33 of the scan loading module 30 are guided by the first rounded corners 220 (and preferably with the second rounded corners 330) and engaged with each other. Therefore, the driving gear 221 is engaged precisely with the engaging gear 33, such that the scan driving module 20 drives the turntable 32 of the scan loading module 30 to rotate.

Figure 2:
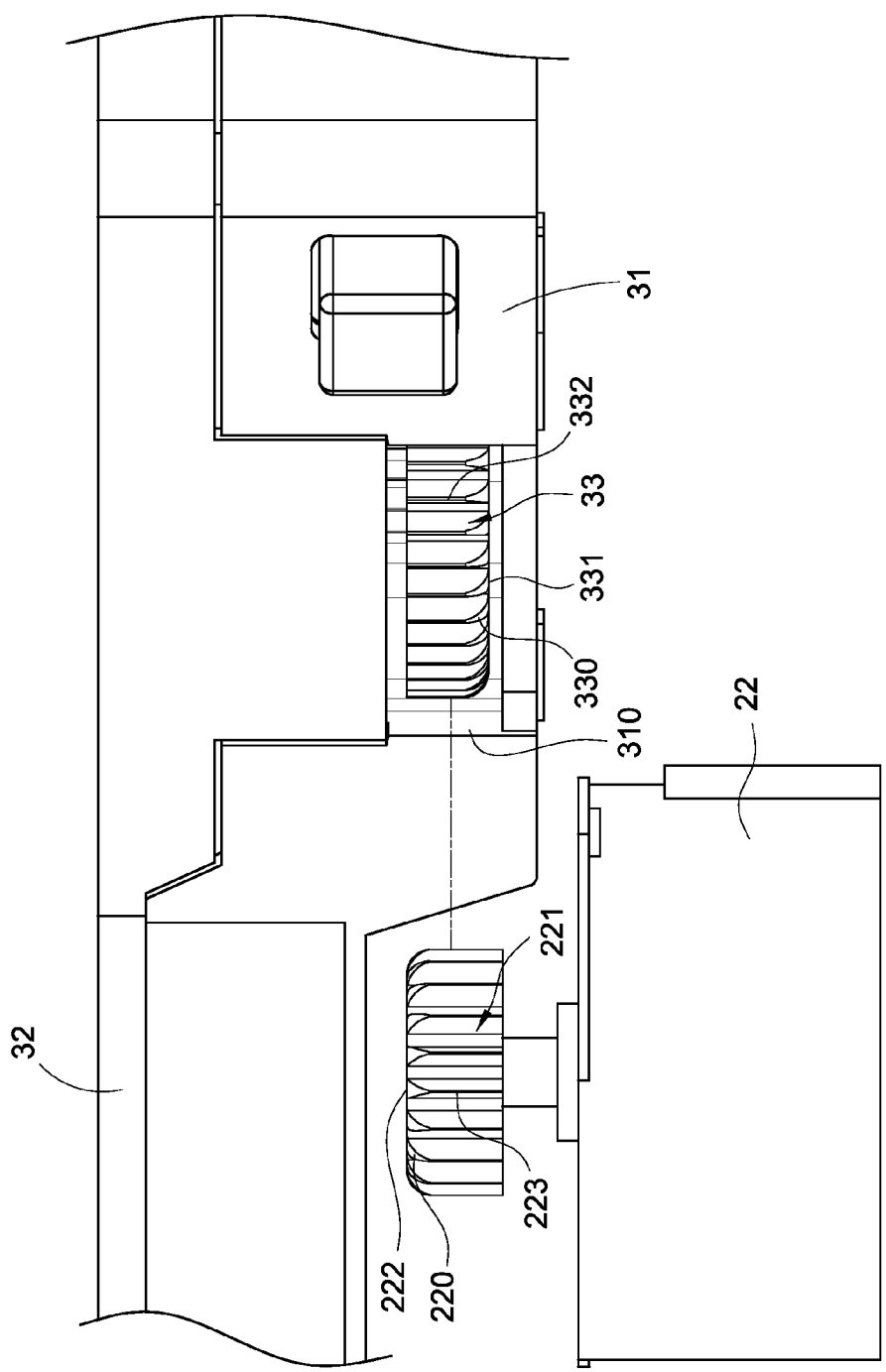
FIG. 2 is a schematic view of aligning a driving gear of a 3D printer of the first exemplary embodiment.
Figure 3:
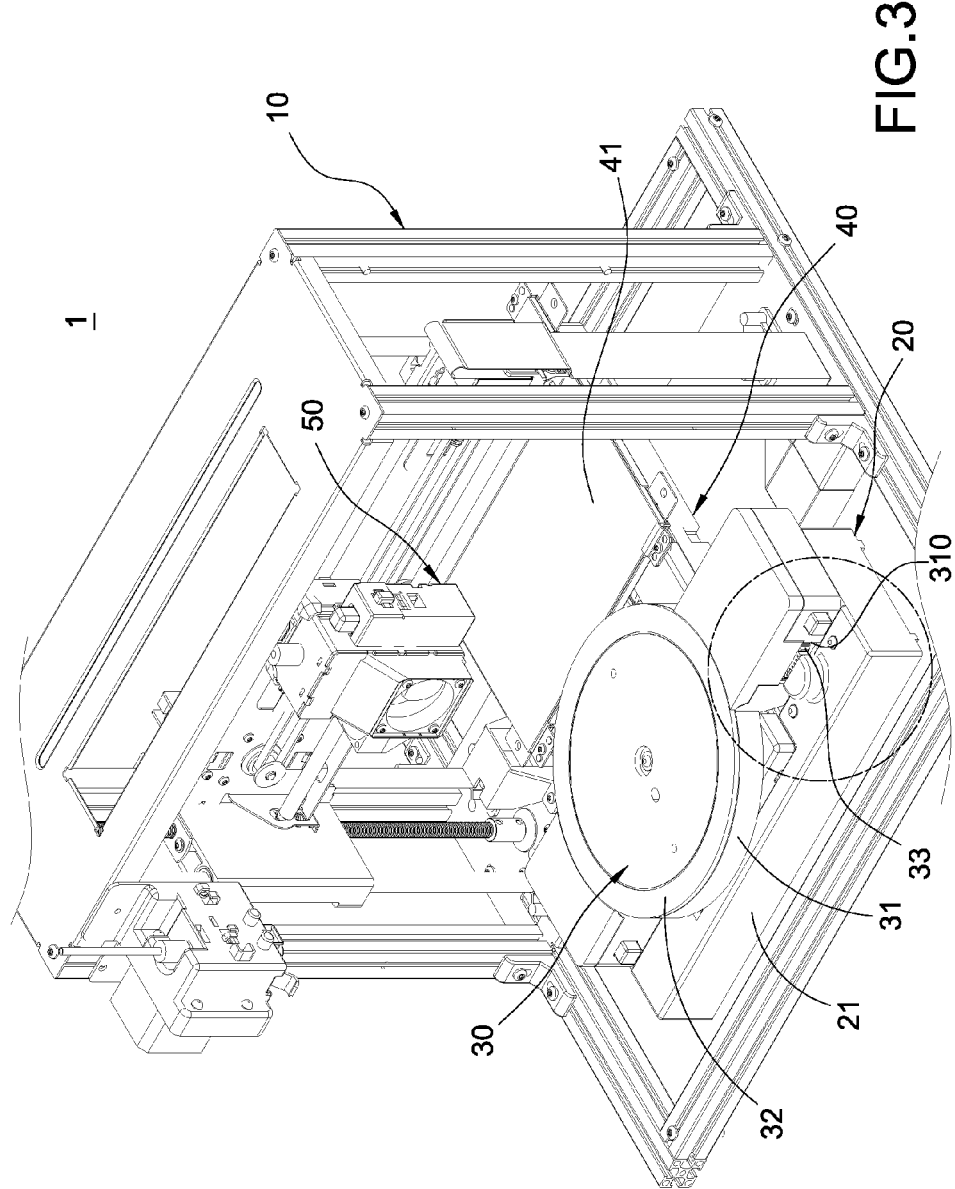
FIG. 3 is a perspective view of a 3D printer of the first exemplary embodiment.
Figure 4:
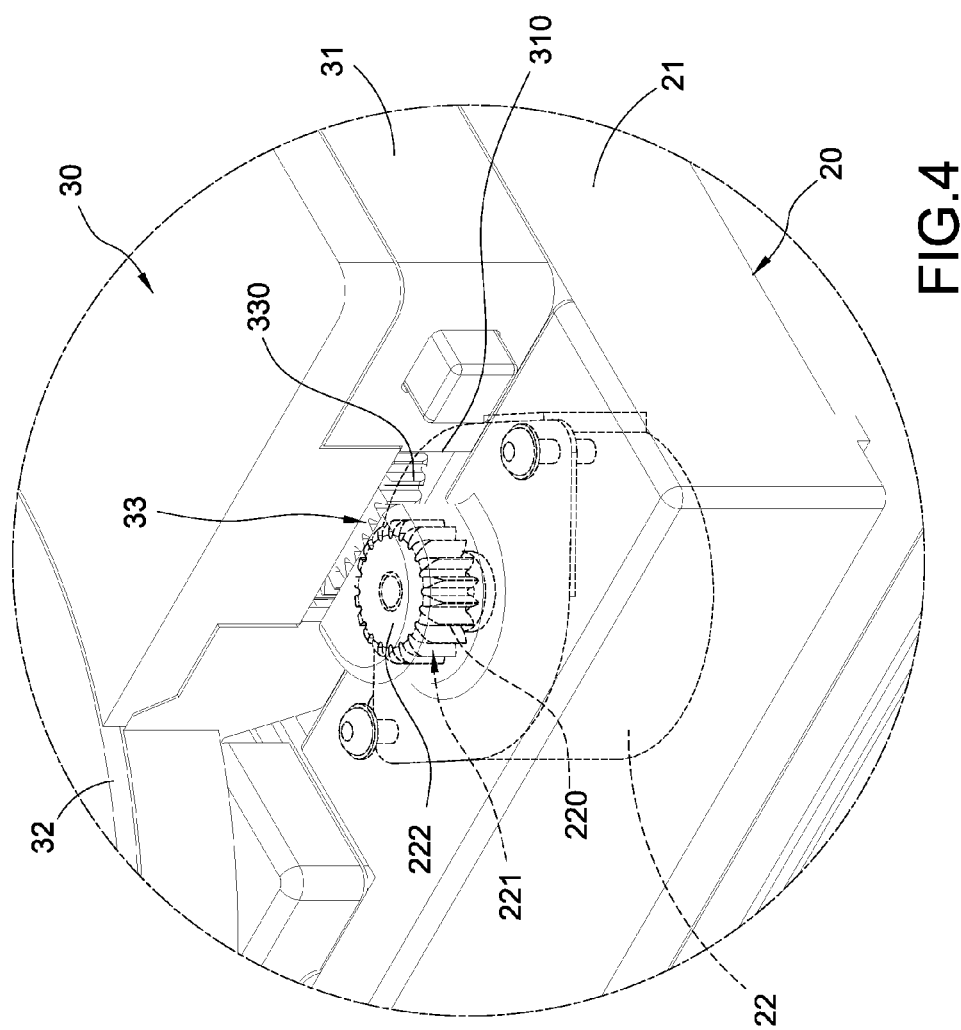
FIG. 4 is a partial schematic view of a scan loading module and a scan driving module combined with each other in accordance with the first exemplary embodiment.

It is noteworthy that the scan driving module 20 further comprises a sensor 23 installed at the base 21, and the scan loading module 30 further comprises a blocking elastic arm 311 exposed from the bottom side of the loading table 31 to block the sensor 23. Therefore, the sensor 23 and the blocking elastic arm 311 may be used to determine whether the loading table 31 has rotated a round with respect to the base 21. In the exemplary embodiment as shown in FIG. 2, each gear of the driving gear 221 has a first rounded corner 220, and each gear of the engaging gear 33 has a second rounded corner 330. For example, the first rounded corner 220 of the driving gear 221 is extended from an end surface 222 of each gear towards a tooth tip 223 of the each gear. Similarly, the second rounded corner 330 is also extended from an end surface 223 of each gear towards a tooth tip 332 of each gear. When the driving gear 221 and the engaging gear 33 are engaged, the driving gear 221 and the engaging gear 33 are guided by the rounded corners 220, 330 and engaged with each other securely. Therefore, the scan driving module 20 and the scan loading module 30 can be aligned precisely to facilitate the operation.

In an exemplary embodiment of this disclosure, it is noteworthy that the base 21 of the scan driving module 20 has a plurality of snap members 211, and the scan loading module 30 has a plurality of corresponsive snap structures 36. After the scan driving module 20 and the scan loading module 30 are aligned precisely with each other, the scan loading module 30 is snapped with the snap members 211 through the snap structures 36 and stably combined with the base 21 of the scan driving module 20. In addition, the scan loading module 30 further has a press button 37. When it is necessary to remove the scan loading module 30, the press button 37 of the scan loading module 30 is pressed, so that the snap structures 36 are separated from the snap members 211, and the scan loading module 30 can be removed from the scan driving module 20.

Figure 5:
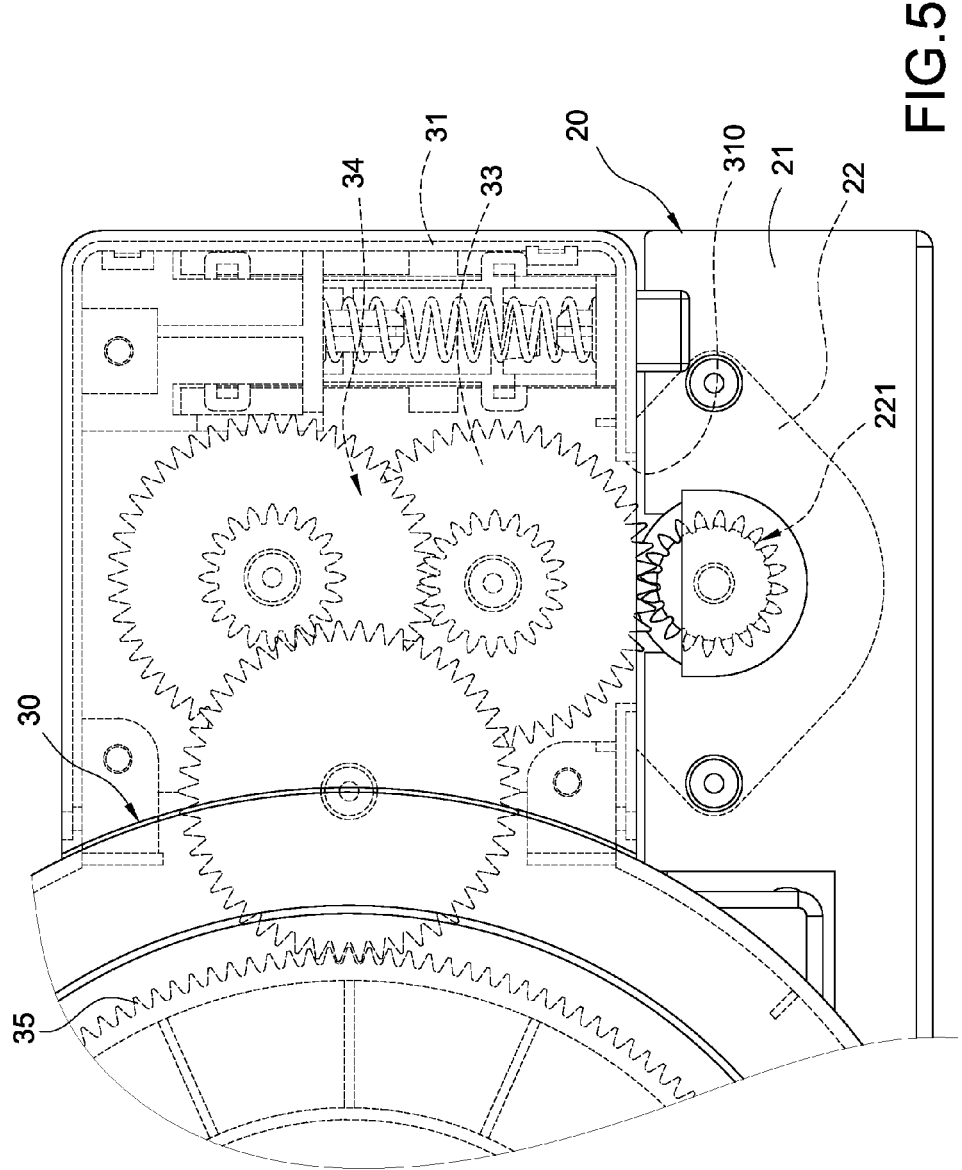
FIG. 5 is a schematic view of driving a scanning device of a 3D printer of the first exemplary embodiment.
Figure 6:
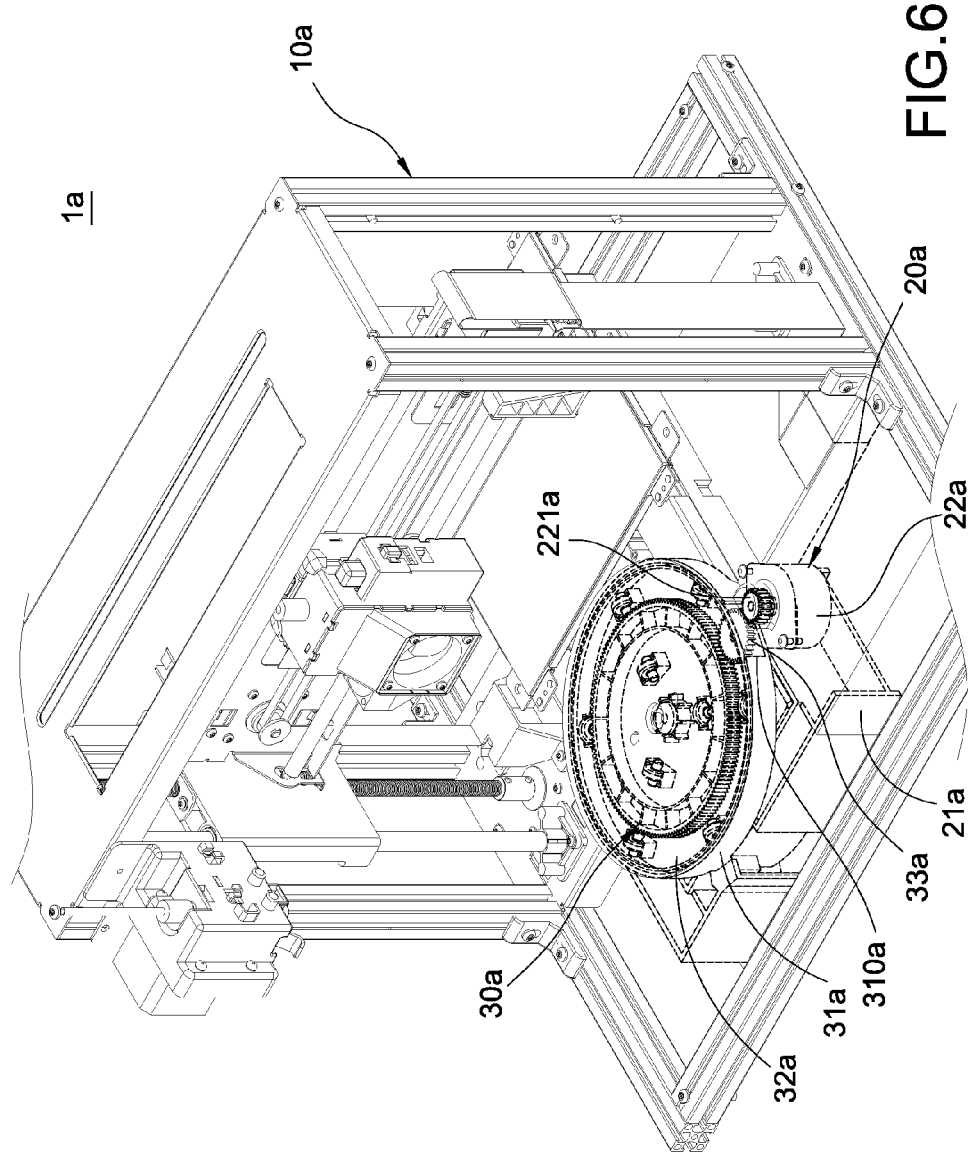
FIG. 6 is a perspective view of a scanning device of a 3D printer in accordance with a second exemplary embodiment of this disclosure.

With reference to FIG. 5 for a schematic view of driving the scanning device of the first exemplary embodiment of this disclosure, the scan loading module 30 of an exemplary embodiment further comprises a reduction gear set 34 connected to the engaging gear 33 and a rotary gear 35 connected to the reduction gear set 34. The rotary gear 35 is installed on the bottom side of the turntable 32. Therefore, the driving gear 221 may be engaged to drive the engaging gear 33, and the engaging gear 33 drives the reduction gear set 34. In addition, the reduction gear set 34 is engaged with the rotary gear 35 to drive the turntable 32, so that the turntable 32 of the scan loading module 30 is driven by the scan driving module 20 to rotate.

With reference to FIGS. 6 to 9 for a perspective view of a scanning device, a schematic view of removing a scan loading module, a schematic view of aligning the scanning device, and a schematic planar view of an aligned scanning device in accordance with a second exemplary embodiment of this disclosure, a 3D printer 1a comprises a body 10a, a scan driving module 20a and a scan loading module 30a, and the scan driving module 20a and the scan loading module 30a are detachably combined with the scan driving module 20a, such that a scanning device is formed in the body 10a.

Figure 7:
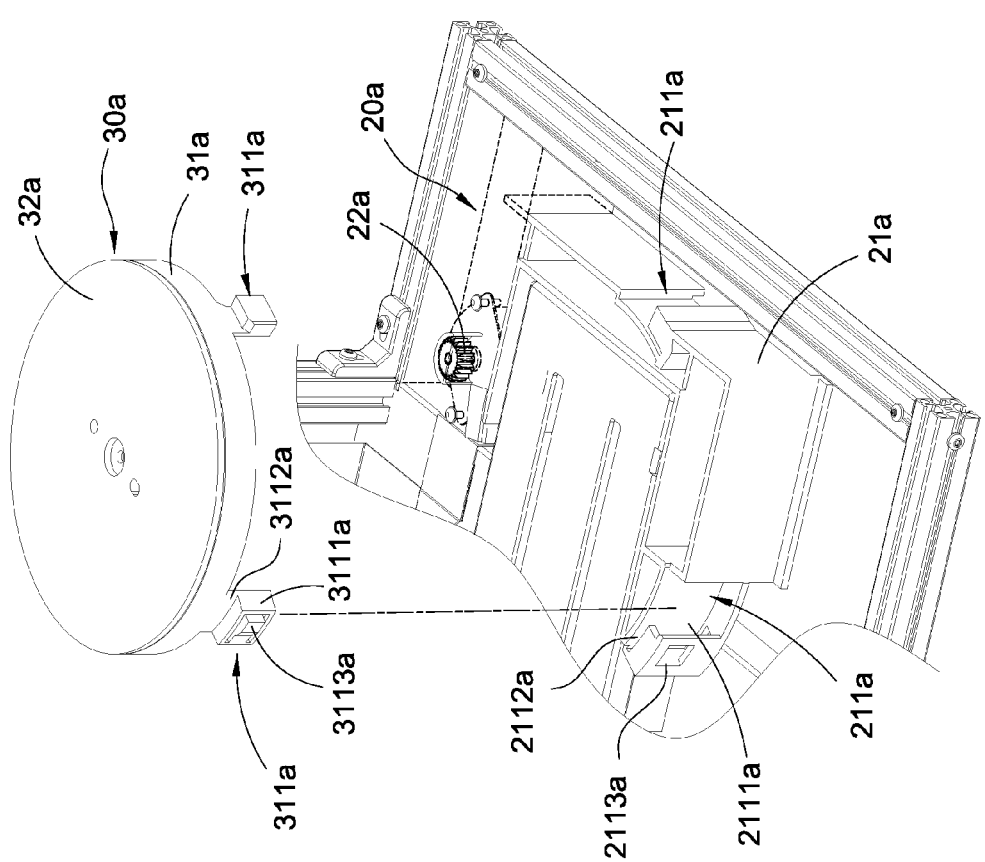
FIG. 7 is a schematic view of removing a scan loading module of a 3D printer of the second exemplary embodiment.
Figure 8:
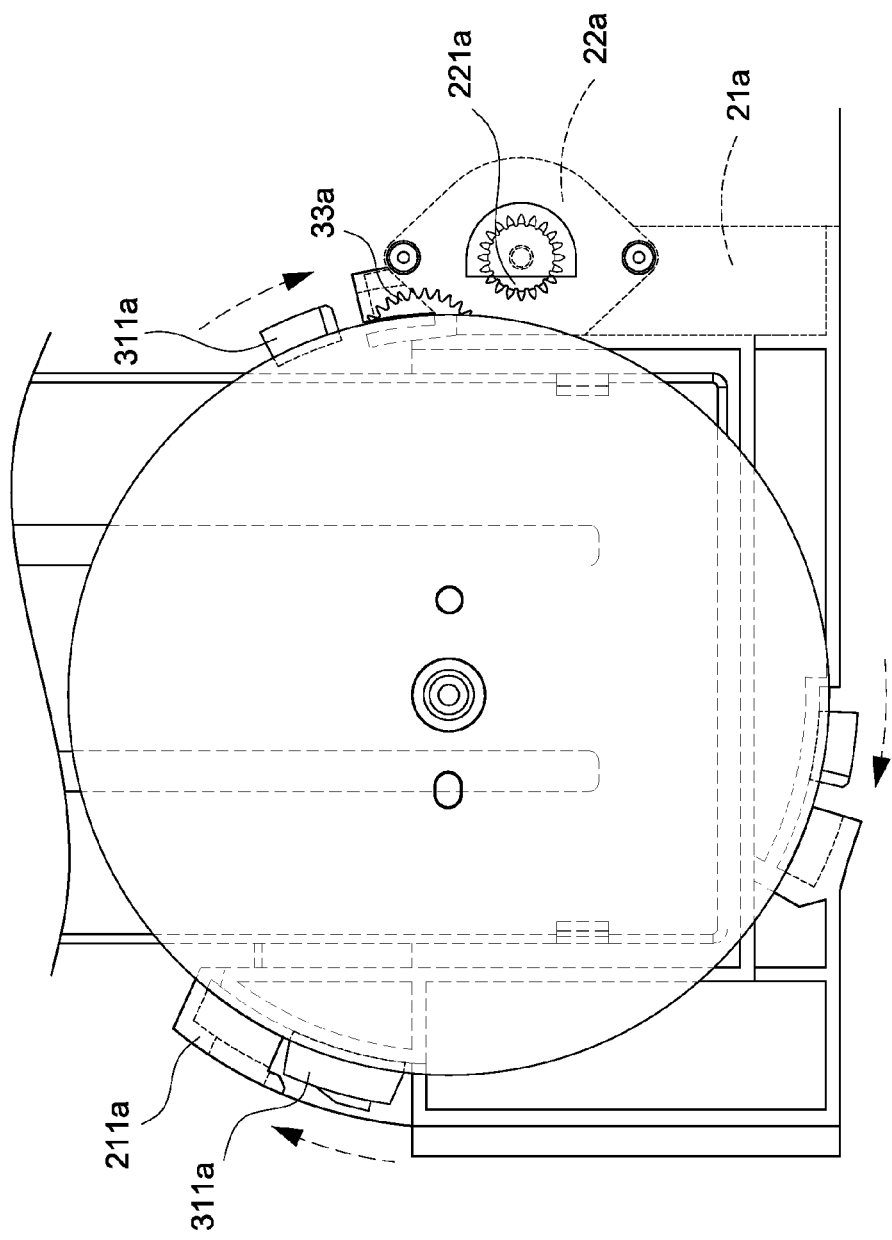
FIG. 8 is a schematic view of aligning a scanning device of a 3D printer of the second exemplary embodiment.
Figure 9:
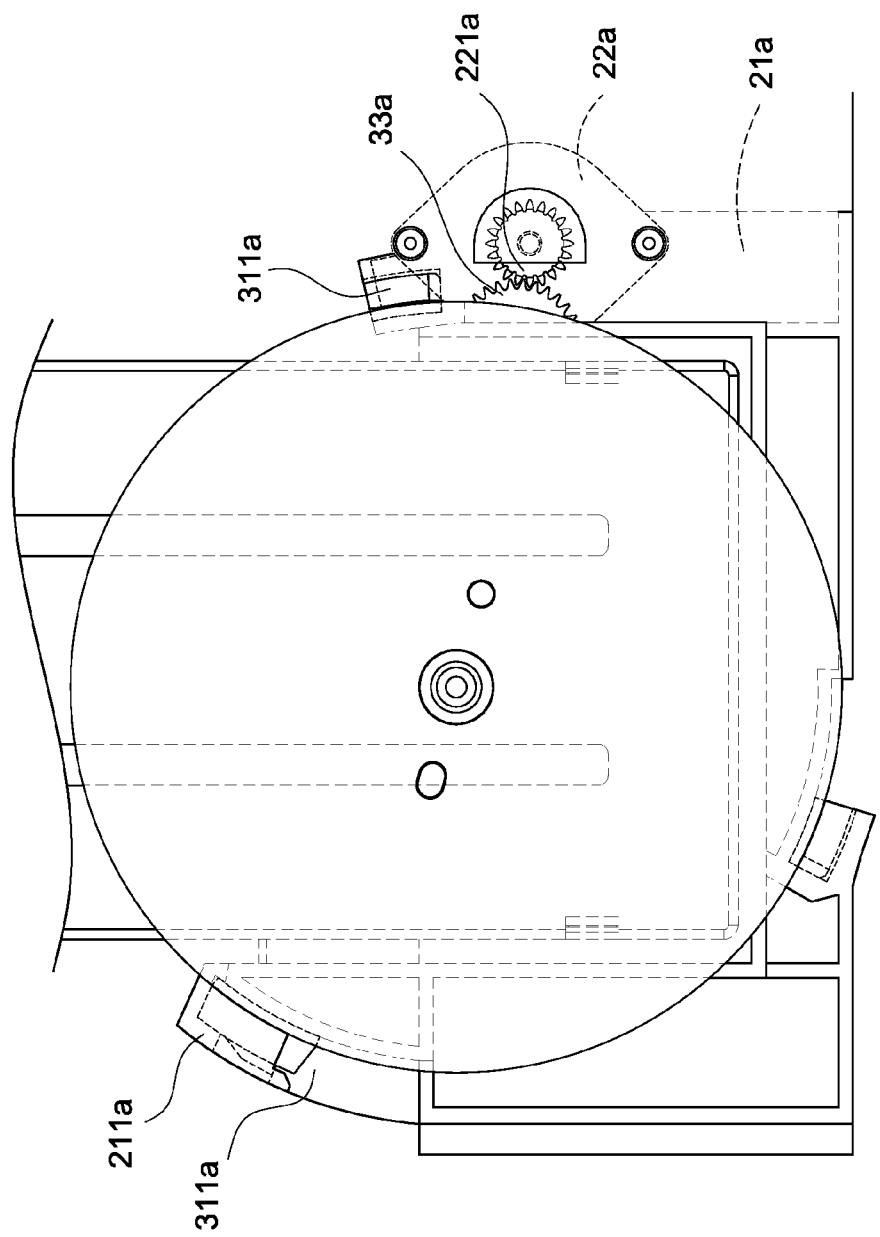
FIG. 9 is a schematic planar view of an aligned scanning device of a 3D printer of the second exemplary embodiment.

In this exemplary embodiment, the scan driving module 20a comprises a base 21a and a motor 22a installed in the base 21a. In addition, the motor 22a has a driving gear 221a. The scan loading module 30a includes a loading table 31a, a turntable 32a combined with the loading table 31a and an engaging gear 33a. Further, a side of the loading table 31a has a notch 310a, and the engaging gear 33a is exposed from the notch 310a. As shown in FIG. 7, the difference between this embodiment and the previous embodiment resides on that the base 21a has a plurality of first positioning portions 211a (preferably three or more first positioning portions 211a) formed thereon, and the loading table 31a has a plurality of second positioning portions 311a (preferably three or more second positioning portions 311a) formed thereon and configured to be corresponsive to the first positioning portions 211a respectively. The driving gear 221a of the scan driving module 20a and the engaging gear 33a of the scan loading module 30a are guided by the first positioning portions 211a and the second positioning portions 311a, such that the driving gear 221a is engaged precisely with the engaging gear 33a, and the scan driving module 20a drives the turntable 32a of the scan loading module 30a to rotate. Specifically, the first positioning portions 211a are separated with an interval apart from each other and on the same plane of the base 21a, and the second positioning portions 311a are configured to be corresponsive to the first positioning portions 211a and disposed on the same plane of the loading table 31a.

In an embodiment of this disclosure, each first positioning portion 211a includes a positioning groove 2111a, and each second positioning portion 311a includes a positioning member 3111a, and the positioning member 3111a is rotated into the positioning groove 2111a, so that the base 21a and the loading table 31a are positioned with respect to each other. However, the implementation mode of the first positioning portion 211a and the second positioning portion 311a is not limited to the aforementioned arrangement only, but any structure capable of positioning the two can be used instead. In practical applications, the first positioning portion 211a may be a positioning member, and the second positioning portion 311a may be a positioning groove.

Preferably, each first positioning portion 211a further includes a plug gap 2112a formed on a side of the positioning groove 2111a, and each second positioning portion 311a further includes a pin 3112a disposed on a side of the positioning member 3111a, and the pin 3112a is inserted into the plug gap 2112a for the positioning purpose.

In addition, some of the first positioning portions 211a further include an engaging hole 2113a formed on a side of the positioning groove 2111a, and some of the second positioning portions 311a further include a bump 3113a formed on a side of the positioning member 3111a, and the bump 3113a is snapped into the engaging hole 2113a for the positioning purpose. Therefore, the base 21a and the loading table 31a are positioned and combined with each other more precisely.

Figure 10:
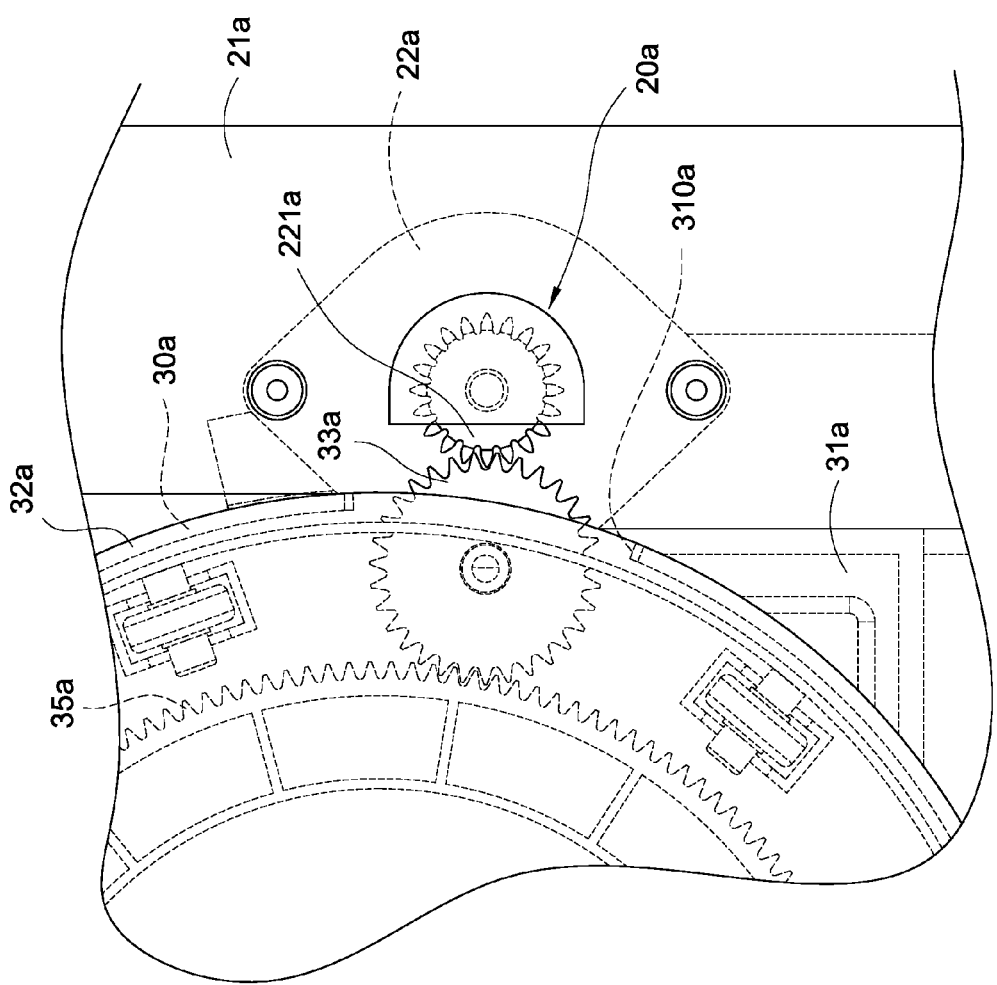
FIG. 10 is a schematic view of a scan loading module of a 3D printer driven by a scan driving module of the second exemplary embodiment.

With reference to FIG. 10 for a schematic view of an exemplary embodiment of a scan loading module driven by a scan driving module of this disclosure, the scan loading module 30a further comprises a rotary gear 35a installed on the bottom side of the turntable 32a. The driving gear 221a is engaged to drive the engaging gear 33a, and the engaging gear 33a is engaged with the rotary gear 35a to drive the turntable 32a. Therefore, the turntable 32a of the scan loading module 30a is driven by the motor 22a of the scan driving module 20a to rotate.

While this disclosure has been described by means of specific embodiments, numerous modifications and variations could be made thereto by those skilled in the art without departing from the scope and spirit of this disclosure set forth in the claims.

What is claimed is:

1. A 3D printer scanning device, comprising:
a body; and
an aligning mechanism, the aligning mechanism comprising:
a scan driving module, installed in the body, and including a base and a motor installed in the base, the motor having a driving gear, and each gear of the driving gear having a first rounded corner; and
a scan loading module, installed in the body, and including a loading table, a turntable combined with the loading table, and an engaging gear coupled to the turntable, a side of the loading table having a notch, and the engaging gear being exposed from the notch;
wherein, the driving gear of the scan driving module and the engaging gear of the scan loading module are provided for engaging the driving gear precisely with the engaging gear through the first rounded corners, so that the scan driving module drives the turntable of the scan loading module to rotate.

2. The 3D printer scanning device as claimed in claim 1, wherein the first rounded corner is extended from each tooth tip towards the top side of each gear.

3. The 3D printer scanning device as claimed in claim 1, wherein the scan loading module further comprises a reduction gear set connected to the engaging gear and a rotary gear connected to the reduction gear set, and the rotary gear is installed on the bottom side of the turntable.

4. The 3D printer scanning device as claimed in claim 1, wherein the scan loading module further comprises a sensor installed at the base, and the scan loading module further comprises a blocking elastic arm exposed from the bottom side of the loading table to block the sensor.

5. The 3D printer scanning device as claimed in claim 1, wherein each gear of the engaging gear has a second rounded corner corresponsive to the driving gear.

6. The 3D printer scanning device as claimed in claim 1, wherein the base of the scan driving module has a plurality of snap members, the loading table of the scan loading module has a plurality of snap structures corresponsive to the loading table, and the scan loading module is snapped with the snap members by the snap structures and stably combined with the base of the scan driving module.

7. A 3D printer scanning device, comprising:
a body; and
an aligning mechanism, the aligning mechanism comprising:
a scan driving module, installed in the body, and including a base and a motor installed in the base, the base having a plurality of first positioning portions formed thereon, and the motor having a driving gear; and
a scan loading module, installed in the body, and including a loading table, a turntable combined with the loading table, and an engaging gear connected to the turntable, a side of the loading table having a notch, the engaging gear being exposed from the notch, and the loading table having a plurality of second positioning portions corresponsive to the first positioning portions respectively;
wherein, the driving gear of the scan driving module and the engaging gear of the scan loading module are guided by the first positioning portions and the second positioning portions, such that the driving gear is engaged precisely with the engaging gear, and the scan driving module drives the turntable of the scan loading module to rotate.

8. The 3D printer scanning device as claimed in claim 7, wherein each first positioning portion is a positioning groove, each second positioning portion is a positioning member, and the positioning member is rotated into the positioning groove to position the base and the loading table with each other.

9. The 3D printer scanning device as claimed in claim 8, wherein each first positioning portion further comprises a plug gap formed on a side of the positioning groove, each second positioning portion further comprises a pin disposed on a side of the positioning member, and the pin is inserted into the plug gap for positioning.

10. The 3D printer scanning device as claimed in claim 8, wherein some of the first positioning portions further comprise an engaging hole formed on a side of the positioning groove, some of the second positioning portions further comprise a bump formed on a side of the positioning member, and the bump is snapped into the engaging hole for positioning.

11. The 3D printer scanning device as claimed in claim 7, wherein the first positioning portions are separated with an interval apart from each other and disposed on the same plane of the base, and the second positioning portions are configured to be corresponsive to the first positioning portions respectively and disposed on the same plane of the loading table.

* * * * *